(12) United States Patent
Martin

(10) Patent No.: US 10,417,490 B2
(45) Date of Patent: Sep. 17, 2019

(54) DOCUMENT IMAGE QUALITY ASSESSMENT

(71) Applicant: MorphoTrust USA, LLC, Billerica, MA (US)

(72) Inventor: Brian Martin, McMurray, PA (US)

(73) Assignee: MorphoTrust USA, LLC, Billerica, MA (US)

( * ) Notice: Subject to any disclaimer, the term of this patent is extended or adjusted under 35 U.S.C. 154(b) by 0 days.

(21) Appl. No.: 15/604,413

(22) Filed: May 24, 2017

(65) Prior Publication Data
US 2017/0344824 A1  Nov. 30, 2017

Related U.S. Application Data

(60) Provisional application No. 62/340,894, filed on May 24, 2016.

(51) Int. Cl.
*G06K 9/00* (2006.01)
*G06K 9/03* (2006.01)

(52) U.S. Cl.
CPC ..... *G06K 9/00463* (2013.01); *G06K 9/00469* (2013.01); *G06K 9/036* (2013.01); *G06K 9/00442* (2013.01)

(58) Field of Classification Search
None
See application file for complete search history.

(56) References Cited

U.S. PATENT DOCUMENTS

| 6,272,245 B1 * | 8/2001 | Lin | G06K 9/00463 382/135 |
| 7,376,258 B2 * | 5/2008 | Klein | G06K 9/036 358/449 |

(Continued)

FOREIGN PATENT DOCUMENTS

EP    0723247    7/1996

OTHER PUBLICATIONS

International Search Report and Written Opinion in International Application No. PCT/US2017/1034339, dated Aug. 7, 2017, 12 Pages.

(Continued)

*Primary Examiner* — Michelle M Entezari
(74) *Attorney, Agent, or Firm* — Fish & Richardson P.C.

(57) ABSTRACT

Methods, systems, and apparatus, including computer programs encoded on a computer storage medium, for assessing document image quality are disclosed. In one aspect, a method includes the actions of receiving one or more images of a document. The actions further include detecting an object that has a shape that is similar to an expected shape of the document. The actions further include determining a focus score that reflects a sharpness of the first image. The actions further include determining a border fit score that reflects a likelihood that the object corresponds to the document. The actions further include determining an expected shape score that reflects a correlation between the shape of the object and an expected shape of the document. The actions further include determining a quality score that reflects a quality of the first image. The actions further include determining whether to perform document authentication on the first image.

20 Claims, 7 Drawing Sheets

(56) References Cited

U.S. PATENT DOCUMENTS

| | | | |
|---|---|---|---|
| 8,358,827 B2* | 1/2013 | Faulkner | G06K 9/036 |
| | | | 358/3.27 |
| 8,577,118 B2* | 11/2013 | Nepomniachtchi | G06K 9/3275 |
| | | | 382/137 |
| 8,688,579 B1* | 4/2014 | Ethington | G06Q 20/0425 |
| | | | 705/42 |
| 8,983,170 B2* | 3/2015 | Nepomniachtchi | |
| | | | G06K 9/00536 |
| | | | 382/137 |
| 9,208,393 B2* | 12/2015 | Kotovich | G06K 9/036 |
| 9,396,235 B1* | 7/2016 | Wald | G06F 17/30663 |
| 9,769,354 B2* | 9/2017 | Thrasher | H04N 1/4092 |
| 10,083,218 B1* | 9/2018 | Bellert | G06F 17/30595 |
| 2004/0012815 A1 | 1/2004 | Fuchigami | |
| 2005/0030396 A1 | 2/2005 | Park et al. | |
| 2008/0030798 A1 | 2/2008 | O'Neil | |
| 2008/0310749 A1 | 12/2008 | Liao et al. | |
| 2009/0052751 A1 | 2/2009 | Chaney et al. | |
| 2009/0060374 A1 | 3/2009 | Wang | |
| 2009/0152357 A1 | 6/2009 | Lei et al. | |
| 2009/0214132 A1 | 8/2009 | Yamada et al. | |
| 2009/0220149 A1 | 9/2009 | Menadeva et al. | |
| 2009/0263028 A1 | 10/2009 | Kwon | |
| 2009/0324122 A1 | 12/2009 | Kao et al. | |
| 2010/0121644 A1* | 5/2010 | Glasser | G06K 9/00885 |
| | | | 704/273 |
| 2010/0149603 A1 | 6/2010 | Maeda | |
| 2013/0259459 A1* | 10/2013 | Mick | G03B 13/36 |
| | | | 396/121 |
| 2013/0287265 A1 | 10/2013 | Nepomniachtchi et al. | |
| 2014/0327940 A1 | 11/2014 | Amtrup et al. | |
| 2014/0347557 A1 | 11/2014 | Gomita et al. | |
| 2015/0054975 A1* | 2/2015 | Emmett | H04N 5/23245 |
| | | | 348/220.1 |
| 2015/0128240 A1* | 5/2015 | Richards | H04L 63/0861 |
| | | | 726/7 |
| 2015/0199584 A1 | 7/2015 | Mudge | |
| 2015/0206169 A1* | 7/2015 | Ye | G06Q 30/0242 |
| | | | 705/14.41 |
| 2016/0042249 A1* | 2/2016 | Babenko | G06K 9/00744 |
| | | | 382/170 |
| 2016/0063343 A1* | 3/2016 | Loui | G06K 9/4604 |
| | | | 382/195 |
| 2016/0104040 A1 | 4/2016 | Ragnet et al. | |
| 2016/0125613 A1* | 5/2016 | Shustorovich | G06K 9/00463 |
| | | | 382/140 |

OTHER PUBLICATIONS

European Extended Search Report in European Application No. 17803534.1, dated May 8, 2019, 8 pages.

* cited by examiner

DOCUMENT IMAGE QUALITY ASSESSMENT

CROSS REFERENCE TO RELATED APPLICATION

This application claims the benefit of U.S. Application No. 62/340,894, filed on May 24, 2016, which is incorporated by reference.

FIELD

This specification relates to document authentication.

BACKGROUND

Identification ("ID") documents play a critical role in today's society. One example of an ID document is an ID card. ID documents are used on a daily basis to prove identity, to verify age, to access a secure area, to evidence driving privileges, to cash a check, and so on. Airplane passengers are required to show an ID document during check in, security screening, and prior to boarding their flight. In addition, because we live in an ever-evolving cashless society, ID documents are used to make payments, access an automated teller machine (ATM), debit an account, make a payment, and the like.

SUMMARY

The subject matter of this application relates to automated document authentication (e.g., ensuring a document is authentic by examination of the document's visual characteristics). In some implementations, authenticating a document accurately depends on having properly captured digital images. These images may be scanned on a flat glass image plan similar to a flatbed scanner. Doing this ensures correctly focused, illuminated and scaled image of the document.

The system described below is able to extend document authentication abilities to uncontrolled capture (e.g., acquiring an image from an un-calibrated configuration). An example would be to take an image of a driver's license with a cell phone and use that image to authenticate the driver's license.

The system is able to quantify the 'goodness' of a digital image of a document for the purpose of both providing automatic corrections to the image and authenticating the document. This will enable a mobile phone to be used to capture images of documents, and the usability of those images to be evaluated on the phone to either provide feedback during the capture, or to simply accept or reject the image.

A method for assessing the quality of a captured document prior to performing document authentication includes the following actions. One or more digital images are acquired of a document. The rectangular shaped document is detected with the borders of the document defined for the first image. The quality of the first image is quantified using (i) the sharpness of focus of the document information, (ii) the confidence of the fit of the borders of the document, and (iii) the deviation of the document shape from the expected shape of the document. If the quality of any metric or combination of metrics in the action where the quality of the first image is quantified are below thresholds, the image is rejected and the other images are considered. For each additional image, the quality using the three features above (e.g., (i) the sharpness of focus of the document information, (ii) the confidence of the fit of the borders of the document, and (iii) the deviation of the document shape from the expected shape of the document) and using the values or some combination of them from the earlier quantification of the quality of the first image, an image is retained as a candidate for document authentication if the image is of sufficient quality. The image is sent to the document authentication system. If no image was above minimum thresholds, the capture process fails. In some implementations, the image is retained as a candidate for document authentication is the one with a highest quality score.

In some implementations, user feedback on failures can be provided (e.g., out of focus measure). Feedback to the capture device can be provided (e.g., focus the camera). The results of the quality metrics can be used to select the candidate image from multiple shape candidates in a single image. The resulting image can go to a pre-processing step prior to document authentication to correct the perspective distortion of the camera.

According to an innovative aspect of the subject matter described in this application, a method for assessing document image quality includes the actions of receiving one or more images of a document; detecting, in a first image of the one or more images, an object that has a shape that is similar to an expected shape of the document; determining a focus score that reflects a sharpness of the first image; determining a border fit score that reflects a likelihood that the object corresponds to the document; determining an expected shape score that reflects a correlation between the shape of the object and an expected shape of the document; based on the focus score, the border fit score, and the expected shape score, determining a quality score that reflects a quality of the first image; determining whether the quality score satisfies a quality score threshold; and based on determining whether the quality score satisfies the quality score threshold, determining whether to perform document authentication on the first image.

These and other implementations can each optionally include one or more of the following features. The action of determining whether the quality score satisfies a quality score threshold includes determining that the quality score satisfies the quality score threshold. The action of determining whether to perform document authentication on the first image includes determining to perform document authentication on the first image based on determining that the quality score satisfies the quality score threshold. The action of determining whether the quality score satisfies a quality score threshold includes determining that the quality score does not satisfy the quality score threshold. The action of determining whether to perform document authentication on the first image includes determining not to perform document authentication on the first image based on determining that the quality score does not satisfy the quality score threshold. The actions further include, in response to determining not to perform document authentication on the first image, determining a quality score for a second image of the one or more images.

The actions further include determining whether the focus score satisfies a focus score threshold. The action of determining whether to perform document authentication on the first image is further based on determining whether the focus score satisfies the focus score threshold. The actions further include determining whether the border fit score satisfies a border fit score threshold. The action of determining whether to perform document authentication on the first image is further based on determining whether the border fit score satisfies the border fit score threshold. The actions further include determining whether the expected shape score satisfies an expected shape score threshold. The action of determining whether to perform document authentication on the first image is further based on determining whether the expected shape score satisfies the expected shape score threshold. The focus score reflects a sharpness of only the object.

The document is an identification document. The one or more images of the document are frames of a video. The actions further include determining, for each of the one or more images of the document, a quality score; and determining that the quality score of the first image is greater than the quality scores of each of the one or more images other than the first image. The action of determining whether the quality score of the first image satisfies a quality score threshold includes determining that the quality score of the first image satisfies the quality score threshold. The action of determining whether to perform document authentication on the first image includes determining to perform document authentication on the first image based on determining that the quality score of the first image satisfies the quality score threshold and based on determining that the quality score of the first image is greater than the quality scores of each of the one or more images other than the first image. The action of determining whether the quality score satisfies a quality score threshold includes determining that the quality score does not satisfy the quality score threshold. Based on determining that the quality score does not satisfy the quality score threshold the actions further include providing, to the user, feedback for improving quality of an image of the document.

Other implementations of this aspect include corresponding systems, apparatus, and computer programs recorded on computer storage devices, each configured to perform the operations of the methods.

The subject matter described in this application may have one or more of the following advantages. A system may perform document authentication only on images of documents that are of sufficient quality. Limiting document authentication to only specific images may decrease computing resources needed for document authentication, such as processing power and battery power.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
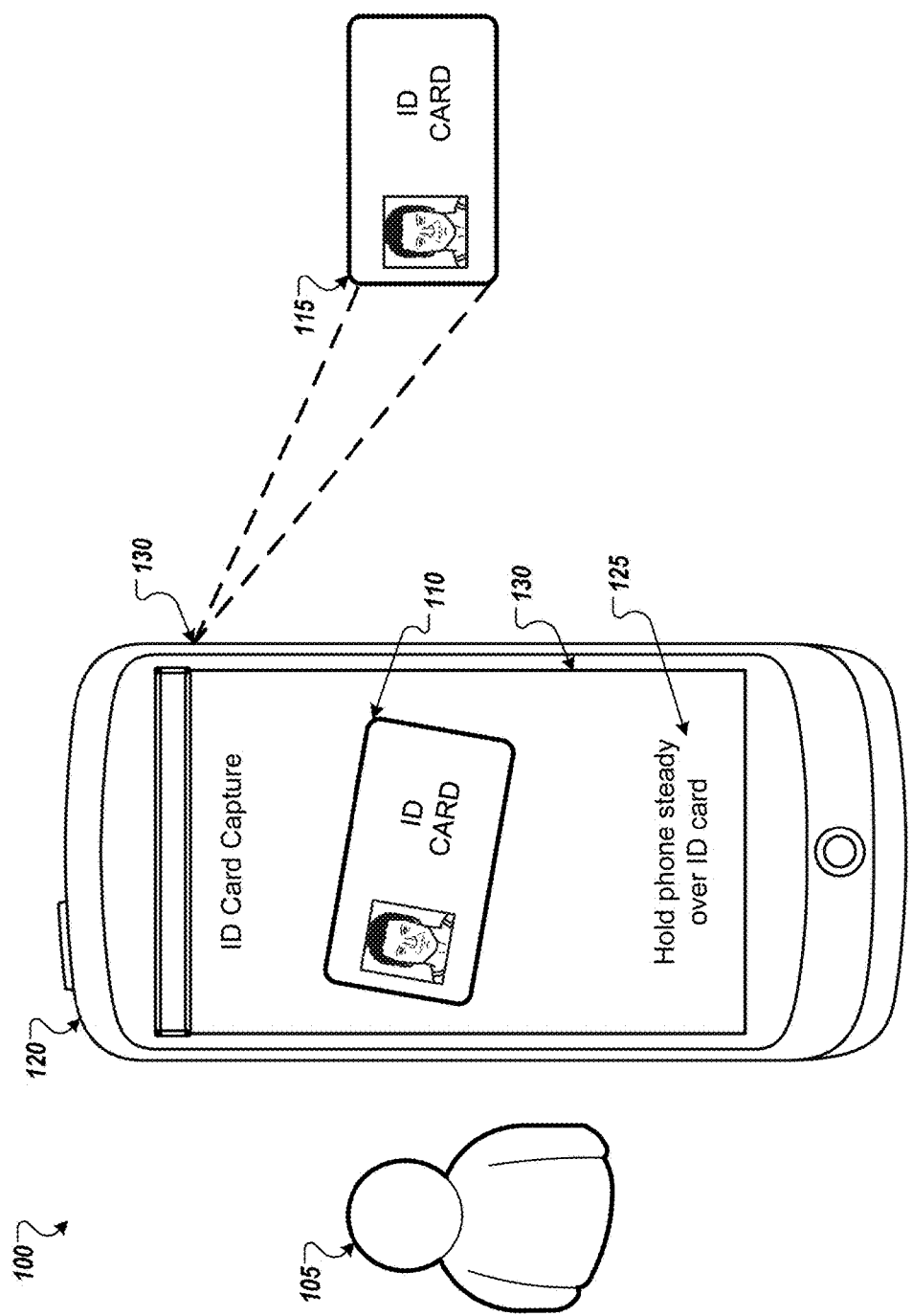
FIG. 1 illustrates an example of a user capturing an image of an identification card using a mobile device.

FIG. 1 illustrates an example of a user 105 capturing an image 110 of an identification card 115 using a mobile device 120. Briefly, and as described in more detail below, the user 120 is attempting to capture an image of sufficient quality so that an application or entity can authenticate the identification card 115. To authenticate the identification card 115, the image 110 should be in focus, have a shape that approximately matches the expected shape of the identification card 115, and have a sufficiently clear border.

In the example system 100 of FIG. 1, the user 105 may use the mobile device 120 to execute an application or visit a website that requests an image of the user's identification card 115. The user 105 may be unable to hold the mobile device 120 perfectly parallel to the identification card 115 for a sufficient period. Therefore, the captured image 110 may be slightly askew.

The application or website may present instructions 125 to hold the mobile device 120 parallel and steady over the identification card 115. While the user 105 holds the mobile device 120 over the identification card, a camera 130 of the may capture video. The mobile device 120 may provide the video to a server. The server may analyze the video frame by frame. The server may identify a particular frame that has an image of the identification card that is of sufficient quality for authentication purposes. The server executes a process to identify an image of the identification card 115 that will be described in more detail below with respect to FIGS. 2 and 3.

The server identifies a particular frame of the video and provides data to the mobile device 120 that the server captured an image of the identification card 115 of sufficient quality. The mobile device 120 may provide feedback to the user 105 through the display 130. For example, the mobile device 120 may provide on the display 130 text that indicates that the server identified an image of the identification card 115 of sufficient quality. As another example, the mobile device 120 may display a graphical indicator that the server identified an image of the identification card 115 of sufficient quality. The graphical item may be a green border around the image of the identification card 115. With an image of the identification card 115 of sufficient quality, the server may perform document authentication on the image or provide the image to another server for document authentication.

Figure 2:
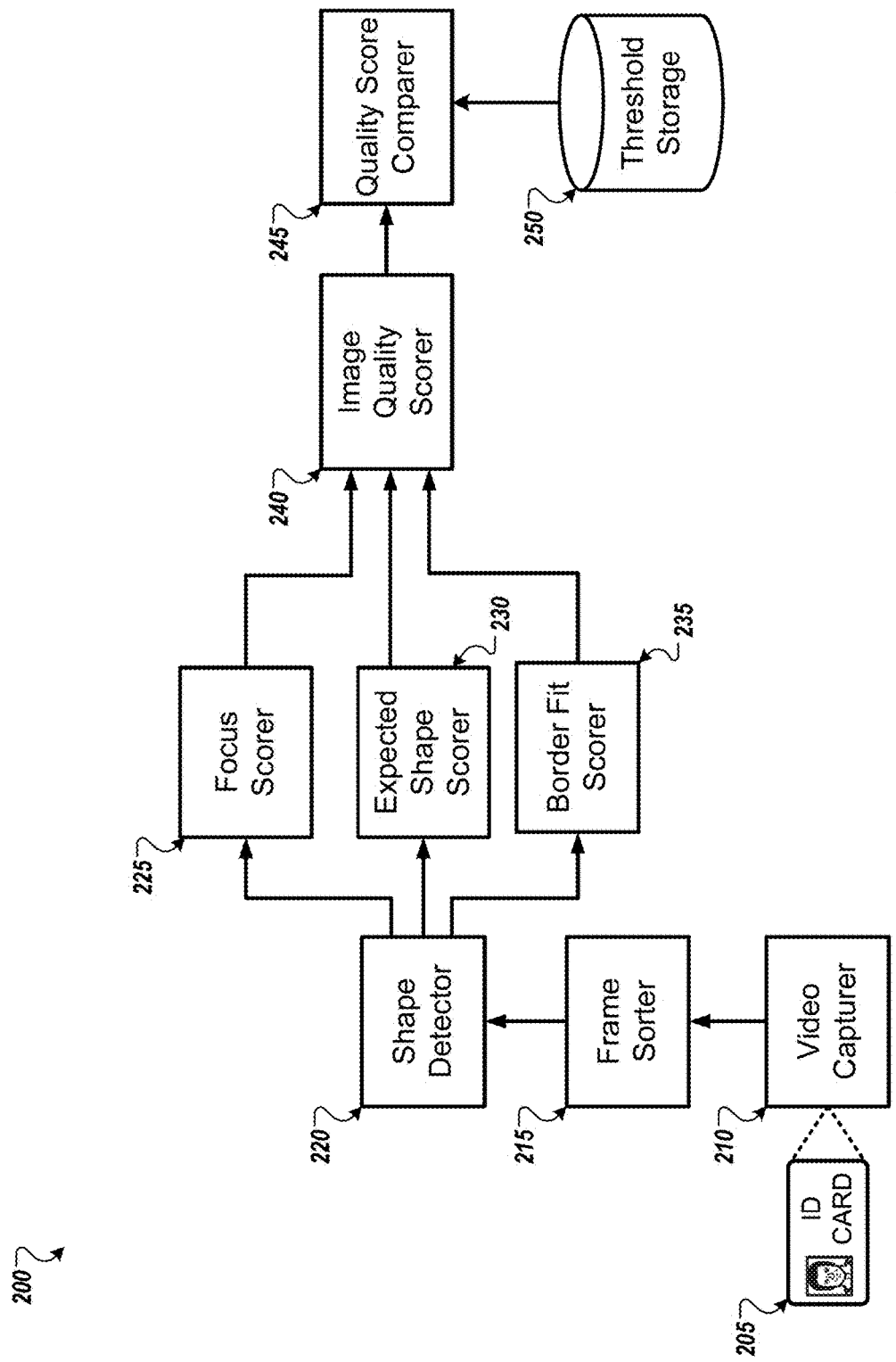
FIG. 2 illustrates an example system for assessing the quality of an image of a document.

FIG. 2 illustrates an example system 200 for assessing the quality of an image of a document. Briefly, and as described in more detail below, the system 200 processes images of a document 205. In processing the images of the document 205, the system 200 identifies an image that is of sufficient quality to perform document authentication on the document 205. The system 200 may be implemented on one or more computing devices. For example, the system 200 may be implemented on a mobile phone. As another example, portions of the system 200 such as the video capturer 210 may be implemented on a mobile phone while the other portions may be implemented on a server.

In more detail and as illustrated in FIG. 2, a video capturer 210 captures video of a document 205. The document 205 may be any type of document. For example, the document 205 may be an identification document (e.g., driver's license), a passport, a contract, or any other similar type of document that may require authentication. The video capturer 210 may begin to capture video when the system 200 receives input from a user or when the system 200 executes an instruction to begin capturing video.

The video capturer 210 may provide the captured video to the frame sorter 215. The frame sorter 215 may be configured to divide the captured video into individual frames. The frame sorter 215 may continuously divide the captured video as the frame sorter 215 receives video. In some implementations, the frame sorter 215 may divide a video clip into individual frames.

The frame sorter 215 provides video frames to the shape detector 220. The shape detector 220 is configured to detect a border of rectangular-like shapes in each of the video frames. In some implementations, the shape detector is configured to detect borders of different shapes depending on the expected shape of the document 205. For example, the expected shape may be a four-sided shape with ratios that are similar to a credit card or driver's license. The expected shape may be a four-sided shape with ratios that are similar to a passport. The expected shape may be a circular shape. The shape detector 220 may detect contrast differences between pixels to identify a likely border of the document 205.

The shape detector 220 provides data identifying the likely border of the document 205 and the corresponding image to the focus scorer 225, the expected shape scorer 230, and the border fit scorer 235. The focus scorer 225 is configured to calculate a focus score that reflects a focus level of the image. In some implementations, the focus scorer calculates a focus score for the portion of the image within the likely border of the document 205. For example, the focus score may be 0.9 for a sharp image of the document 205. The focus score may be 0.5 for a less sharp image of the document 205.

The expected shape scorer 230 may be configured to calculate an expected shape score of the likely border of the document 205 compared to an expected shape of the document 205. For example, the expected shape score may be 0.9 if the likely border has corners that are within two degrees of ninety degrees and a ratio of a long side to a short side that is within five percent of the expected ratio. The expected shape score may be 0.5 if the likely border has corners that are between ten and fifteen degrees of ninety degrees and a ratio of a long side to a short side that is between fifteen and twenty percent of the expected ratio. In some implementations, the system 200 may receive input from a user or another computing device indicating the expected document. The system 200 may then retrieve an expected shape of the document. For example, the system 200 may receive input indicating that the expected document is a driver's license. The system may then retrieve an expected shape and ratio of a driver's license.

The border fit scorer 235 may be configured to calculate a border fit score that reflects a likelihood that the identified border is the actual border of the document 205. The border fit score may be based on a contrast between pixels located along the identified border. More pixels with higher contrast along the identified border may indicate a higher confidence that the identified border is the actual border of the document. For example, the border fit score may be 0.88 if the border fit scorer 235 determines that the identified border is likely the actual order of the document 205. The border fit score may be 0.4 if the border fit scorer 235 determines that the identified border is less likely the actual border of the document 205.

The focus scorer 225, the expected shape scorer 230, and the border fit scorer 235 may provide their respective scores to the image quality scorer 240. The image quality scorer 240 may combine the focus score, the expected shape score, and the border fit score to calculate a quality score that reflects the overall quality of the video frame as it relates to the quality of the image of the document 205. In some implementations, the image quality scorer 240 may sum or average the focus score, the expected shape score, and the border fit score. In some implementations, the image quality scorer 240 may compute a quality score by weighting the focus score, the expected shape score, and the border fit score differently. For example, the image quality scorer 240 may weigh the expected shape score twice as much as the border fit score and the focus score. The image quality scorer 240 may weigh each score differently depending on the expected document. For example, focus may be more important for a contract and expected shape may be more important for a driver's license.

The image quality scorer 240 provides the quality score, the focus score, the expected shape score, and the border fit score to the quality score comparer 245. In some implementations, the quality score comparer 245 compares the quality score to a quality score threshold from the threshold storage 250. If the quality score satisfies a quality score threshold, then quality score comparer 245 provides the corresponding image of the document 205 to an authentication module. For example, if the quality score is 0.85 and the quality score threshold is 0.80, then the quality score comparer 245 may provide the corresponding image to an authentication module. If the quality score does not satisfy the quality score threshold, then the quality score comparer 245 continue comparing additional quality scores received from the image quality scorer 240. If the quality score comparer 245 provides an image of the document to the authentication module, then the quality score comparer 245 may provide a signal to the video capturer 210 to cease video capture.

In some implementations, the quality score comparer 245 may compare each of the quality score, the focus score, the expected shape score, and the border fit score to a respective threshold. If each score satisfies its respective threshold, then the quality score comparer 245 provides the image of the document 205 to the authentication module. If one of the scores does not satisfy its respective threshold, then the quality score comparer 245 may continue comparing scores of additional images from the image quality scorer 240.

In some implementations, the video capturer 210 may capture a fixed number of image frames of the document 205. In this instance, the system 200 may process all the frames. The quality score comparer 245 may provide the image with the highest quality score to the authentication module. The quality score compare 245 may only provide the image with the highest quality score to the authentication module if the quality score and, if necessary, the focus score, the expected shape score, and the border fit score satisfy the thresholds in the thresholds storage 250. If none of the images have a sufficient quality score, then the quality score comparer 245 may provide data indicating that the user should attempt to capture a better image of the document 205.

In some implementations, the quality score comparer 245 may provide feedback to the user that is specific to the scores that did not satisfy their respective thresholds. For example, if the focus score does not satisfy the focus score threshold, the quality score comparer 245 may provide feedback to the user to try to improve the focus. If the expected shape score and the border fit score both do not satisfy their respective thresholds, then the quality score comparer 24 may provide feedback to the user to hold the mobile device parallel to the document and to place the document 205 on a surface with a contrasting background.

Figure 3:
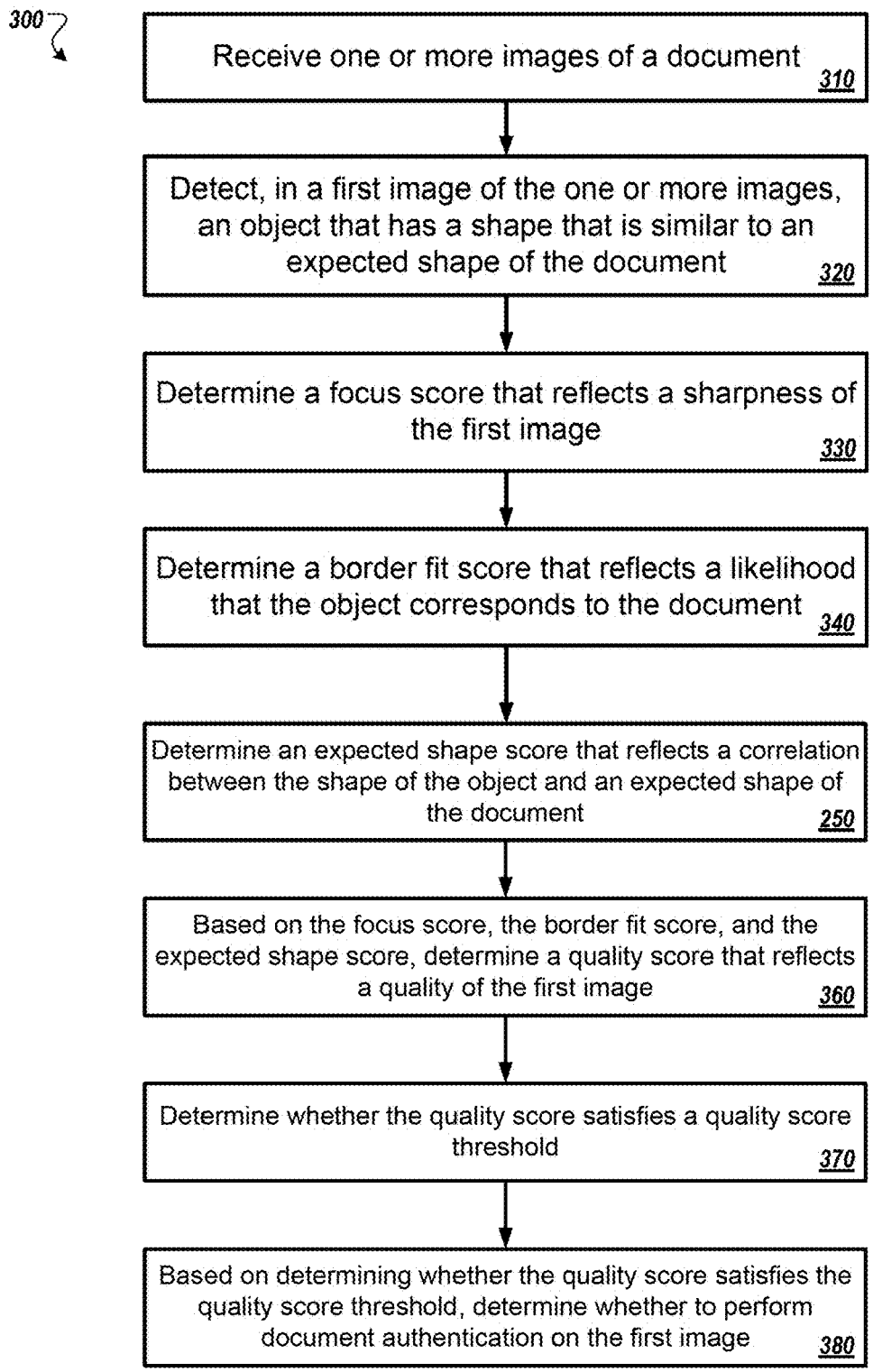
FIG. 3 illustrates an example process for assessing the quality of an image of a document.

FIG. 3 illustrates an example process 300 for assessing the quality of an image of a document. In general, the process 300 determines a quality score that reflects the quality of the document captured in the image. The quality score is based on the focus of the document, a confidence that the process identified the document border, and the deviation of the identified shape of the document to the expected shape of the document. The process 300 will be described as being performed by a computer system comprising one or more computers, for example, the system 100 as shown in FIG. 1 or system 200 as shown in FIG. 2.

The system received one or more images of a document (310). In some implementations, the document is an identification document (e.g., driver's license, passport, etc.). In some implementations, the document is contract or other legal document. In some implementations, the images of the document are frames of a video The system detects, in a first image of the one or more images, an object that has a shape that is similar to an expected shape of the document (320). In some implementations, the system detects contrast between pixels within the image. Areas where neighboring pixels have greater contrast may be areas that are more likely to correspond to edges of the document.

The system determines a focus score that reflects a sharpness of the first image (330). In some implementations, the focus score only reflects a sharpness of the portion of the image identified as the object.

The system determines a border fit score that reflects a likelihood that the object corresponds to the document (340). The border fit score may reflect a likelihood that the identified border of the object is the border of the document. In some implementations, the border fit score may indicate a higher likelihood that the identified border of the object is the border of the document if the contrast between pixels along the border is greater than other areas of the image.

The system determines an expected shape score that reflects a correlation between the shape of the object and an expected shape of the document (350). In some implementations, the correlation score may be greater if the expected shape of the document has right angle corners and the shape of the object has nearly right angle corners. In some implementations, the correlation score may be greater if the expected shape of the document has a long side to short side ratio and the same radio of the object is near the same value.

The system, based on the focus score, the border fit score, and the expected shape score, determines a quality score that reflects a quality of the first image (360). In some implementations, the system sums or averages the focus score, the border fit score, and the expected shape score. In some implementations, the determines the quality score by weighing each of the focus score, the border fit score, and the expected shape score. The system may weight each score differently depending on the type of document or on the type of device or both. The type of device may also cause the system to weight the scores differently. For example, the system may weigh the border fit score differently depending on the system capturing the images with a mobile phone camera or a webcam.

The system determines whether the quality score satisfies a quality score threshold (370). In some implementations, the system determines whether the focus score satisfies a focus score threshold. In some implementations, the system determines whether the border fit score satisfies a border fit focus score. In some implementations, the system determines whether the expected shape score satisfies an expected shape score threshold.

The system, based on determining whether the quality score satisfies the quality score threshold, determines whether to perform document authentication on the first image (380). In some implementations, the system performs document authentication on the image if the quality score satisfies a quality score threshold. In some implementations, the system performs document authentication on the image if the quality score, the border fit score, the expected shape score, and the focus score each satisfy their respective thresholds. In some implementations, the system performs document authentication on the image if any combination of the quality score, the border fit score, the expected shape score, and the focus score each satisfy their respective thresholds.

In some implementations, the system performs stages 310 to 380 for each of the one or more images of the document. In this instance, the system selects the image with the highest quality score for document authentication. The system may only select the image with the highest quality score if the quality score and any other scores satisfy their respective thresholds. In some implementations, none of the images may be of sufficient quality. In this instance, the system may not perform document authentication on any of the images. In some implementations, the system may not perform document authentication on any of the images if the system is processing images for more than a particular period of time. For example, if the system processes images for one minute, then the system may not perform document authentication on any of the images. In this instance, the system may provide feedback to the user to attempt a different configuration for capturing images of the document.

In some implementations, the thresholds may be device dependent. For example, if the system captures the images with a mobile camera phone, then the thresholds may be different than if the system captures the images with a webcam.

In more detail, the process described in this application is designed to take real time video input and detect driver's license cards in the field of view. The detected licenses are segmented from the image and returned in at in a standard rectangular format at the requested resolution along with quality metrics to determine the suitability for further processing.

The method may be customized for grayscale landscape frame buffers with height of three-hundred pixels. Any other format image will be converted to grayscale and resampled to minimum image dimension of three-hundred pixels. Any size input video frame can be used, but it should be able to support the desired resolution of the output. If it cannot meet the desired output resolution, the output will be up-sampled and the resolution quality metric will show a low score.

Figure 4:
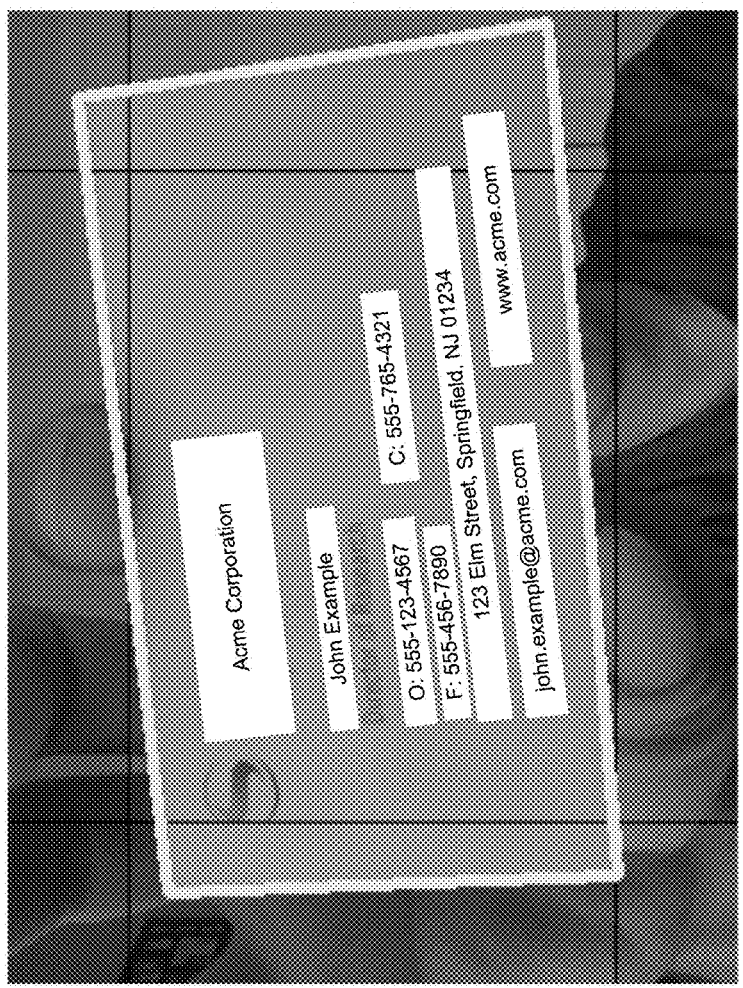
FIG. 4 illustrates an example video capture from a laptop computer of a business card with thin lines to illustrate a recommended capture area and bold lines that highlight the detected business card.
Figure 5:
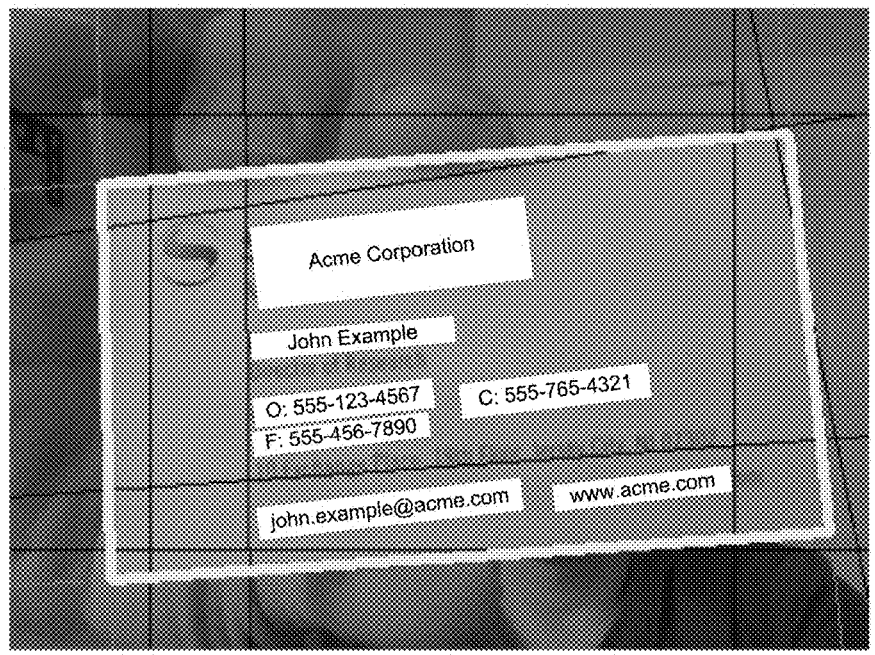
FIG. 5 illustrates, in the top image, an example video capture of a business card with example line candidates that are the thin lines, and, in the bottom image, an example diagnostic output of the edges detected and used for locating the business card.
Figure 5:
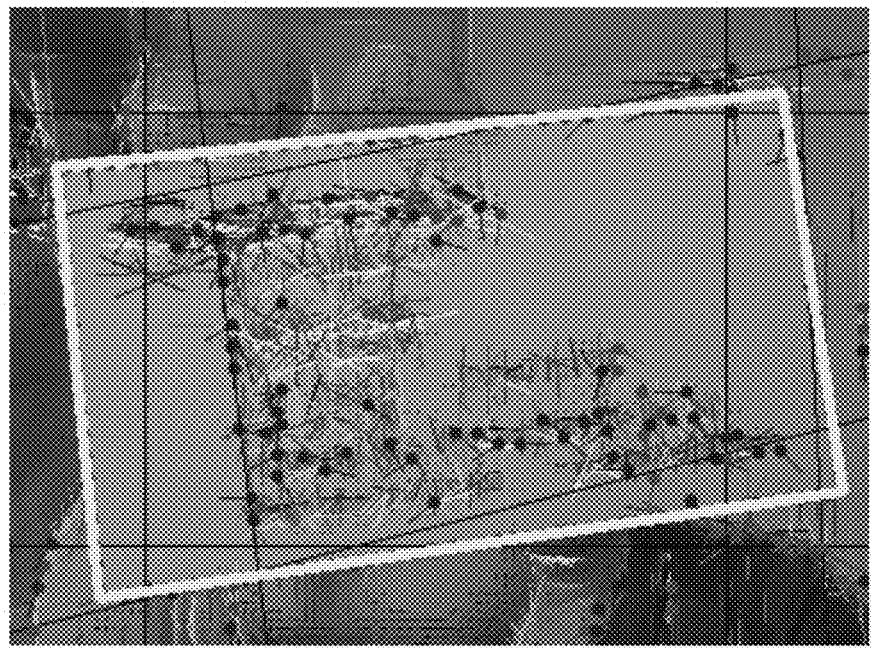

The method may expect a card to be presented into the middle of the video image with approximately one sixth of the area being the background border. This can be seen in FIG. 4 that illustrates a sample video capture (e.g., from laptop computer and of business card). The lines that are perpendicular to the edges of the figure show the recommended capture area with one sixth border and the bold border (e.g., marginal quality) highlights of the detected card.

Each video frame that is captured is down sampled, converted to grayscale, and edges in the vicinity of the one sixth boarder are detected to find line candidates. The two edge candidates, that likely correspond to the most accurate edges, for each of the four boarders are used to construct rectangle candidates. These rectangle candidates are scored on their shape to pick the most likely card candidate (e.g., large cards with aspect ratio 3.370 to 2.125).

In some implementations, since the method is edge based, when the card has other high contrast edges in the print or when the card is against a background of similar color, the may perform additional processing to find the correct line candidates to construct the rectangle. If an accurate set of lines or if an accurate rectangle cannot be detected, the capture process will continue to the next video frame.

Figure 6:
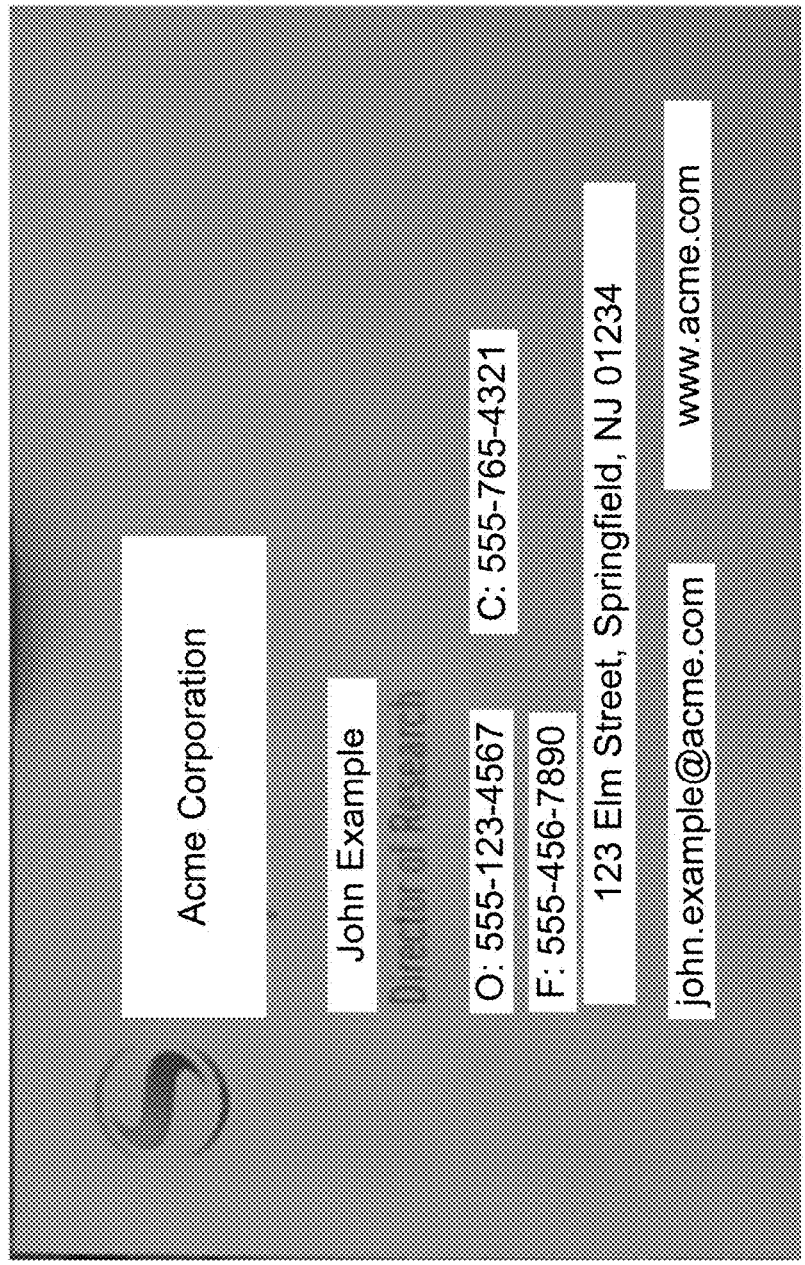
FIG. 6 illustrates an example output rectangle with linear skew correction applied to make a standard shape business card (or driver's license card).

The likeliest rectangle candidate (e.g., a convex quadrilateral at this point) is chosen and then mapped to a rectangle (e.g., 3.370×2.125) and re-rendered at the requested resolution to that shape. The rectangle fit may be only coarsely aligned to the card as illustrated in FIG. 6. In some implementations, the actions include fine tuning the alignment of the rectangle at higher resolutions.

The actions include analyzing the rectangular sample for quality. The metrics calculated include: Focus, Exposure, Color Saturation, and Resolution. In some implementations, these are returned on a 0-100 scale (e.g., 100 indicating a highest score). These quality scores along with the rectangle confidence score are used as an overall capture score.

After one capture is complete, the software can display the detected rectangle on the video feed and color code the rectangle to reflect the capture score (e.g., red=poor, yellow=marginal, green=good).

The capture method continues and captures another frame, detects the rectangle and scores the result. If the new capture is likely better than the old capture, the new result is kept. If it is likely worse, then the method continues to capture. If a likely good capture is detected after a particular amount of time (e.g., three seconds), the capture is complete. If a likely good capture is not detected after the particular amount of time (e.g., three seconds), the previous likely best result is erased and another capture attempt is started. After a specified number of capture attempts (e.g., nine seconds worth) the method determine that the capture has not completed successfully.

In some implementations, if a likely good capture is detected in the first particular amount of time (e.g. three seconds), it may be beneficial to store that result but take another attempt (e.g., a three second attempt) to determine if the result is better. After acquiring a likely good quality image, the rectangular output can be used for further processing such as fine tuning alignment, optical character recognition, driver's license state detection, color (white balance) correction, illumination correction, etc. In some implementations, a device, such as a laptop computer executes the method at a rate of ten millisecond per frame and may run at near real time on a mobile device.

Figure 7:
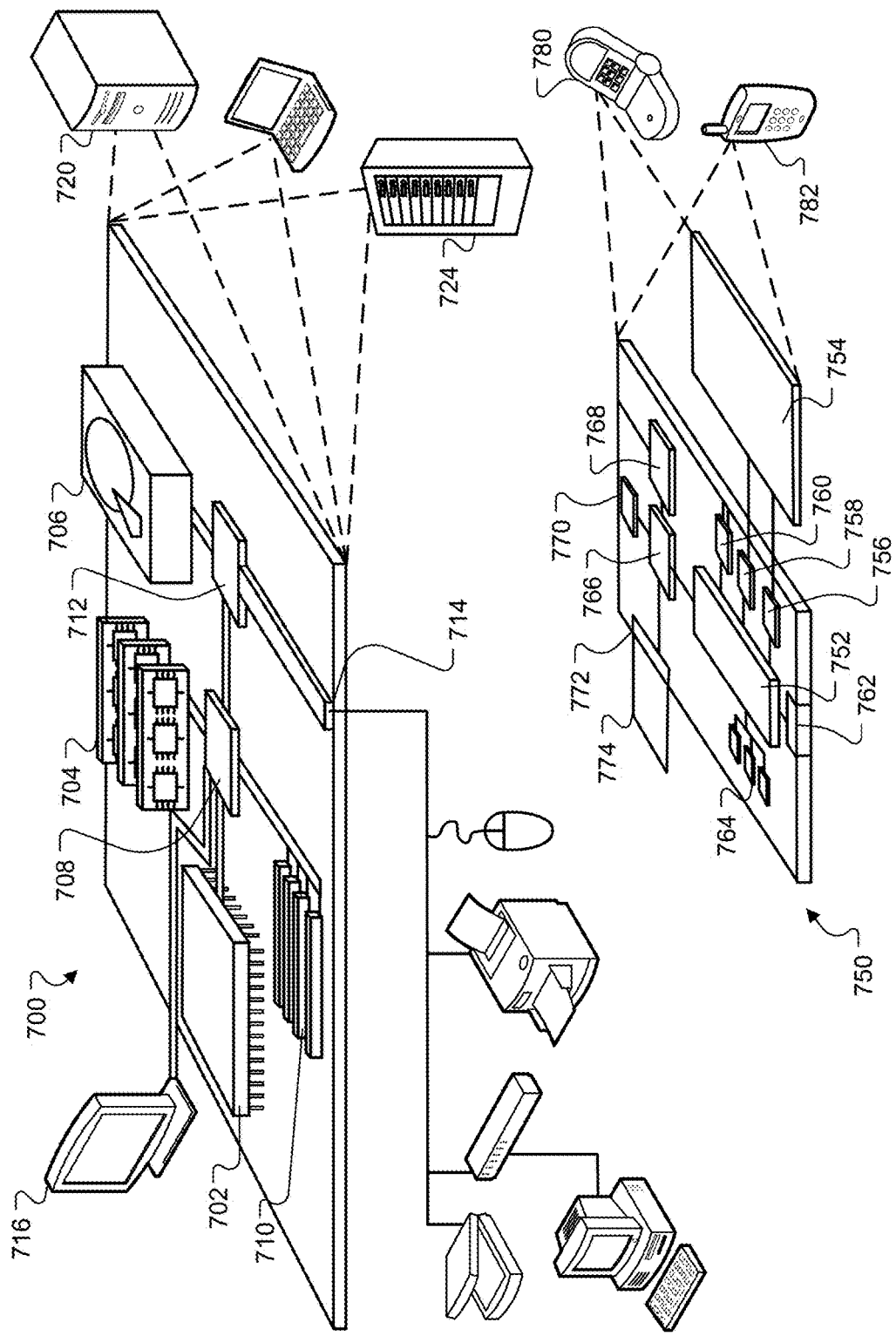
FIG. 7 illustrates an example of a computing device and a mobile computing device.

FIG. 7 shows an example of a computing device 700 and a mobile computing device 750 that can be used to implement the techniques described here. The computing device 700 is intended to represent various forms of digital computers, such as laptops, desktops, workstations, personal digital assistants, servers, blade servers, mainframes, and other appropriate computers. The mobile computing device 750 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 702), perform one or more methods, such as those described above. The instructions can also be stored by one or more storage devices such as computer- or machine-readable mediums (for example, the memory 704, the storage device 706, or memory on the processor 702).

The high-speed interface 708 manages bandwidth-intensive operations for the computing device 700, while the low-speed interface 712 manages lower bandwidth-intensive operations. Such allocation of functions is an example only. In some implementations, the high-speed interface 708 is coupled to the memory 704, the display 716 (e.g., through a graphics processor or accelerator), and to the high-speed expansion ports 710, which may accept various expansion cards. In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device, such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 752), perform one or more methods, such as those described above. The instructions can also be stored by one or more storage devices, such as one or more computer- or machine-readable mediums (for example, the memory 764, the expansion memory 774, or memory on the processor 752). In some implementations, the instructions can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver. In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
receiving, by a computing device, one or more images of a document;
detecting, by the computing device and in a first image of the one or more images, an object that has a shape that is similar to an expected shape of the document;
determining, by the computing device, a focus score that reflects a sharpness of the first image;
determining, by the computing device, a level of contrast between a border of the object and a portion of the image surrounding the object;
based on the level of contrast between the border of the object and the portion of the image surrounding the object, determining, by the computing device, a border fit score that reflects a likelihood that the border of the object is a border of the document;
determining, by the computing device, an angle defined by adjacent edges of the border of the object;
comparing, by the computing device, the angle defined by the adjacent edges of the border of the object to an expected angle of adjacent edges of the document;
based on comparing the angle defined by the adjacent edges of the border of the object to an expected angle of adjacent edges of the document, determining, by the computing device, an expected shape score that reflects a correlation between the shape of the object and an expected shape of the document;
based on the focus score, the border fit score, and the expected shape score, determining, by the computing device, a quality score that reflects a quality of the first image;
selecting, by the computing device, from among multiple quality score thresholds for each of multiple types of computing devices, a quality score threshold based on a type of the computing device;
determining, by the computing device, whether the quality score satisfies the quality score threshold; and
based on determining whether the quality score satisfies the quality score threshold, determining, by the computing device, whether to perform document authentication on the first image.

2. The method of claim 1, wherein:
determining whether the quality score satisfies the quality score threshold comprises determining that the quality score satisfies the quality score threshold, and
determining whether to perform document authentication on the first image comprises determining to perform document authentication on the first image based on determining that the quality score satisfies the quality score threshold.

3. The method of claim 1, wherein:
determining whether the quality score satisfies the quality score threshold comprises determining that the quality score does not satisfy the quality score threshold, and
determining whether to perform document authentication on the first image comprises determining not to perform document authentication on the first image based on determining that the quality score does not satisfy the quality score threshold.

4. The method of claim 3, comprising:
in response to determining not to perform document authentication on the first image, determining a quality score for a second image of the one or more images.

5. The method of claim 1, comprising:
determining whether the focus score satisfies a focus score threshold,
wherein determining whether to perform document authentication on the first image is further based on determining whether the focus score satisfies the focus score threshold.

6. The method of claim 1, comprising:
determining whether the border fit score satisfies a border fit score threshold, wherein determining whether to perform document authentication on the first image is further based on determining whether the border fit score satisfies the border fit score threshold.

7. The method of claim 1, comprising:
determining whether the expected shape score satisfies an expected shape score threshold,
wherein determining whether to perform document authentication on the first image is further based on determining whether the expected shape score satisfies the expected shape score threshold.

8. The method of claim 1, wherein the focus score reflects a sharpness of only the object.

9. The method of claim 1, wherein the document is an identification document.

10. The method of claim 1, wherein the one or more images of the document are frames of a video.

11. The method of claim 1, comprising:
determining, for each of the one or more images of the document, a quality score; and
determining that the quality score of the first image is greater than the quality scores of each of the one or more images other than the first image,
wherein determining whether the quality score of the first image satisfies a quality score threshold comprises determining that the quality score of the first image satisfies the quality score threshold, and
wherein determining whether to perform document authentication on the first image comprises determining to perform document authentication on the first image based on determining that the quality score of the first image satisfies the quality score threshold and based on determining that the quality score of the first image is greater than the quality scores of each of the one or more images other than the first image.

12. The method of claim 1, wherein:
determining whether the quality score satisfies a quality score threshold comprises determining that the quality score does not satisfy the quality score threshold, and
based on determining that the quality score does not satisfy the quality score threshold the method further comprises providing, to the user, feedback for improving quality of an image of the document.

13. A system comprising:
one or more computers; and
one or more storage devices storing instructions that are operable, when executed by the one or more computers, to cause the one or more computers to perform operations comprising:
receiving, by a computing device, one or more images of a document;
detecting, by the computing device and in a first image of the one or more images, an object that has a shape that is similar to an expected shape of the document;
determining, by the computing device, a focus score that reflects a sharpness of the first image;
determining, by the computing device, a level of contrast between a border of the object and a portion of the image surrounding the object;
based on the level of contrast between the border of the object and the portion of the image surrounding the object, determining, by the computing device, a border fit score that reflects a likelihood that the border of the object is a border of the document;
determining, by the computing device, an angle defined by adjacent edges of the border of the object;
comparing, by the computing device, the angle defined by the adjacent edges of the border of the object to an expected angle of adjacent edges of the document;
based on comparing the angle defined by the adjacent edges of the border of the object to an expected angle of adjacent edges of the document, determining, by the computing device, an expected shape score that reflects a correlation between the shape of the object and an expected shape of the document;
based on the focus score, the border fit score, and the expected shape score, determining, by the computing device, a quality score that reflects a quality of the first image;
selecting, by the computing device, from among multiple quality score thresholds for each of multiple types of computing devices, a quality score threshold based on a type of the computing device;
determining, by the computing device, whether the quality score satisfies the quality score threshold; and
based on determining whether the quality score satisfies the quality score threshold, determining, by the computing device, whether to perform document authentication on the first image.

14. The system of claim 13, wherein:
determining whether the quality score satisfies the quality score threshold comprises determining that the quality score satisfies the quality score threshold, and
determining whether to perform document authentication on the first image comprises determining to perform document authentication on the first image based on determining that the quality score satisfies the quality score threshold.

15. The system of claim 13, wherein:
determining whether the quality score satisfies the quality score threshold comprises determining that the quality score does not satisfy the quality score threshold, and
determining whether to perform document authentication on the first image comprises determining not to perform document authentication on the first image based on determining that the quality score does not satisfy the quality score threshold.

16. The system of claim 13, wherein the operations further comprise:
determining whether the focus score satisfies a focus score threshold,
wherein determining whether to perform document authentication on the first image is further based on determining whether the focus score satisfies the focus score threshold.

17. The system of claim 13, wherein the operations further comprise:
determining whether the border fit score satisfies a border fit score threshold,
wherein determining whether to perform document authentication on the first image is further based on determining whether the border fit score satisfies the border fit score threshold.

18. The system of claim 13, wherein the operations further comprise:
determining whether the expected shape score satisfies an expected shape score threshold,
wherein determining whether to perform document authentication on the first image is further based on determining whether the expected shape score satisfies the expected shape score threshold.

19. The system of claim 13, wherein the operations further comprise:

determining, for each of the one or more images of the document, a quality score; and determining that the quality score of the first image is greater than the quality scores of each of the one or more images other than the first image, wherein determining whether the quality score of the first image satisfies a quality score threshold comprises determining that the quality score of the first image satisfies the quality score threshold, and wherein determining whether to perform document authentication on the first image comprises determining to perform document authentication on the first image based on determining that the quality score of the first image satisfies the quality score threshold and based on determining that the quality score of the first image is greater than the quality scores of each of the one or more images other than the first image.

20. A non-transitory computer-readable medium storing software comprising instructions executable by one or more computers which, upon such execution, cause the one or more computers to perform operations comprising:

receiving, by a computing device, one or more images of a document;

detecting, by the computing device and in a first image of the one or more images, an object that has a shape that is similar to an expected shape of the document;

determining, by the computing device, a focus score that reflects a sharpness of the first image;

determining, by the computing device, a level of contrast between a border of the object and a portion of the image surrounding the object;

based on the level of contrast between the border of the object and the portion of the image surrounding the object, determining, by the computing device, a border fit score that reflects a likelihood that the border of the object is a border of the document;

determining, by the computing device, an angle defined by adjacent edges of the border of the object;

comparing, by the computing device, the angle defined by the adjacent edges of the border of the object to an expected angle of adjacent edges of the document;

based on comparing the angle defined by the adjacent edges of the border of the object to an expected angle of adjacent edges of the document, determining, by the computing device, an expected shape score that reflects a correlation between the shape of the object and an expected shape of the document;

based on the focus score, the border fit score, and the expected shape score, determining, by the computing device, a quality score that reflects a quality of the first image;

selecting, by the computing device, from among multiple quality score thresholds for each of multiple types of computing devices, a quality score threshold based on a type of the computing device;

determining, by the computing device, whether the quality score satisfies the quality score threshold; and based on determining whether the quality score satisfies the quality score threshold, determining, by the computing device, whether to perform document authentication on the first image.

* * * * *